United States Patent
Shani

(10) Patent No.: US 8,850,458 B1
(45) Date of Patent: Sep. 30, 2014

(54) SYSTEM, METHOD, AND COMPUTER PROGRAM FOR COMBINING RESULTS OF EVENT PROCESSING RECEIVED FROM A PLURALITY OF SERVERS

(75) Inventor: Omer Shani, Savyon (IL)

(73) Assignee: Amdocs Software Systems Limited, Dublin (IE)

( * ) Notice: Subject to any disclaimer, the term of this patent is extended or adjusted under 35 U.S.C. 154(b) by 1502 days.

(21) Appl. No.: 12/135,001

(22) Filed: Jun. 6, 2008

(51) Int. Cl.
*G06F 13/00* (2006.01)
*G06F 9/44* (2006.01)
*G06F 11/00* (2006.01)
*G01R 31/08* (2006.01)

(52) U.S. Cl.
USPC ............... 719/318; 717/124; 714/1; 714/4.1; 370/241; 370/242; 370/248; 370/251

(58) Field of Classification Search
None
See application file for complete search history.

(56) References Cited

U.S. PATENT DOCUMENTS

| | | | | |
|---|---|---|---|---|
| 6,425,096 B1 * | 7/2002 | Liese et al. | | 714/43 |
| 6,530,046 B1 * | 3/2003 | Hasegawa et al. | | 714/719 |
| 6,970,924 B1 * | 11/2005 | Chu et al. | | 709/224 |
| 7,031,868 B2 * | 4/2006 | Yeung | | 702/120 |
| 7,055,137 B2 * | 5/2006 | Mathews | | 717/125 |
| 7,334,162 B1 * | 2/2008 | Vakrat et al. | | 714/38.1 |
| 7,420,928 B2 * | 9/2008 | Lobig | | 370/248 |
| 7,508,920 B1 * | 3/2009 | Yu et al. | | 379/9.02 |
| 7,565,579 B2 * | 7/2009 | Shi | | 714/38.14 |
| 2004/0003070 A1 * | 1/2004 | Fernald et al. | | 709/223 |
| 2006/0168491 A1 * | 7/2006 | Lee et al. | | 714/733 |
| 2008/0235633 A1 * | 9/2008 | Ghiloni et al. | | 715/862 |
| 2008/0295064 A1 * | 11/2008 | Mitra et al. | | 717/100 |

OTHER PUBLICATIONS

Wilner et al., "WindView: A Tool for Understanding Real-time Embedded Software Through System Vizualization," ACM SIGPLAN Notices, vol. 30, Issue 11, pp. 117-123, Nov. 1995.
Hornstein et al., "Test Reuse in CBSE Using Built-in Tests," In the proceedings of the Component-based Software Engineering Workshop: Composing Systems from Components, ECBS 2002, Lund University, Lund, Sweden, Apr. 8-11, 2002.

* cited by examiner

*Primary Examiner* — H S Sough
*Assistant Examiner* — Phuong Hoang
(74) *Attorney, Agent, or Firm* — Zilka-Kotab, PC

(57) ABSTRACT

A system, method, and computer program are provided for combining results of event processing received from a plurality of servers. In use, an event is sent to a plurality of servers. Further, a result of processing of the event is received from each of the servers. In addition, the results received from the plurality of servers are combined.

9 Claims, 6 Drawing Sheets

SYSTEM, METHOD, AND COMPUTER PROGRAM FOR COMBINING RESULTS OF EVENT PROCESSING RECEIVED FROM A PLURALITY OF SERVERS

FIELD OF THE INVENTION

The present invention relates to event processing, and more particularly to results of event processing.

BACKGROUND

Traditionally, event processing has included processing any types of data, instructions, functions, etc. However, techniques for generating results of the event processing have generally been limited. For example, event processing has sometimes been utilized for function testing purposes.

Customarily, a fault within a function has been detected by utilizing a function test. Just by way of example, the function test utilizes a function to generate an output based on a known input. Further, the output is evaluated against known output. In addition, if the output matches the known output, then the function passes the function test. Additionally, if the output does not match the known output, then the function fails the function test. To this end, utilizing such traditional function testing has generally only been suitable when the path through a set of functions is constant. However, in the case where the path of the set of functions is not constant, utilization of such a function test has failed to indicate which particular function has failed. As an example, this case is especially true in environments where debugging facilities are unavailable, such as in production environments.

Furthermore, built-in-tests are traditionally utilized in embedded software environments in order to ensure the correct behavior of a component, a function, or a process. Still yet, in the built-in-tests standard practices, a test is deployed against a single function, otherwise, there may be an ambiguity as to what function malfunctions.

There is thus a need for addressing these and/or other issues associated with the prior art.

SUMMARY

A system, method, and computer program are provided for combining results of event processing received from a plurality of servers. In use, an event is sent to a plurality of servers. Further, a result of processing of the event is received from each of the servers. In addition, the results received from the plurality of servers are combined.

DETAILED DESCRIPTION

Figure 1:
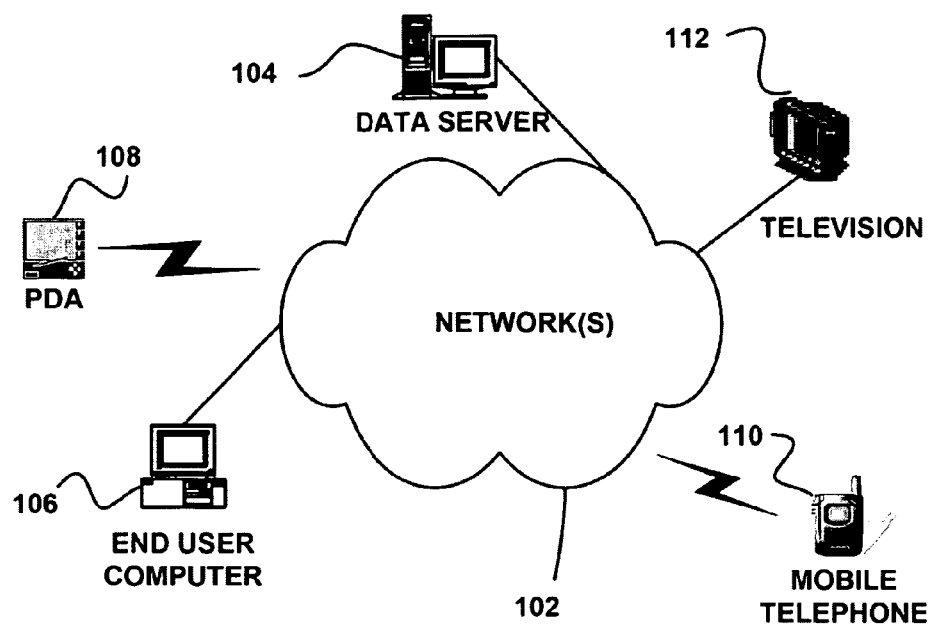
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
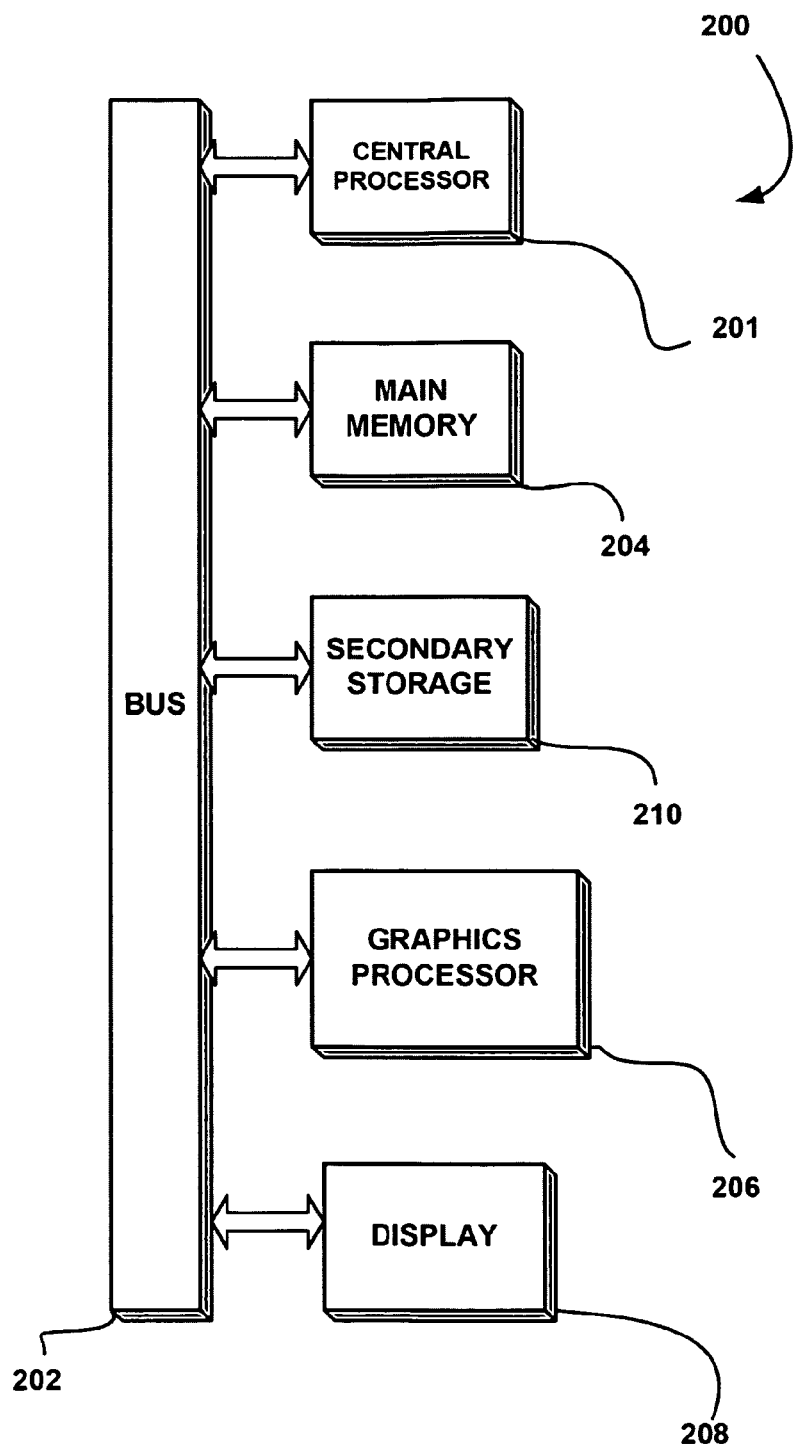
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
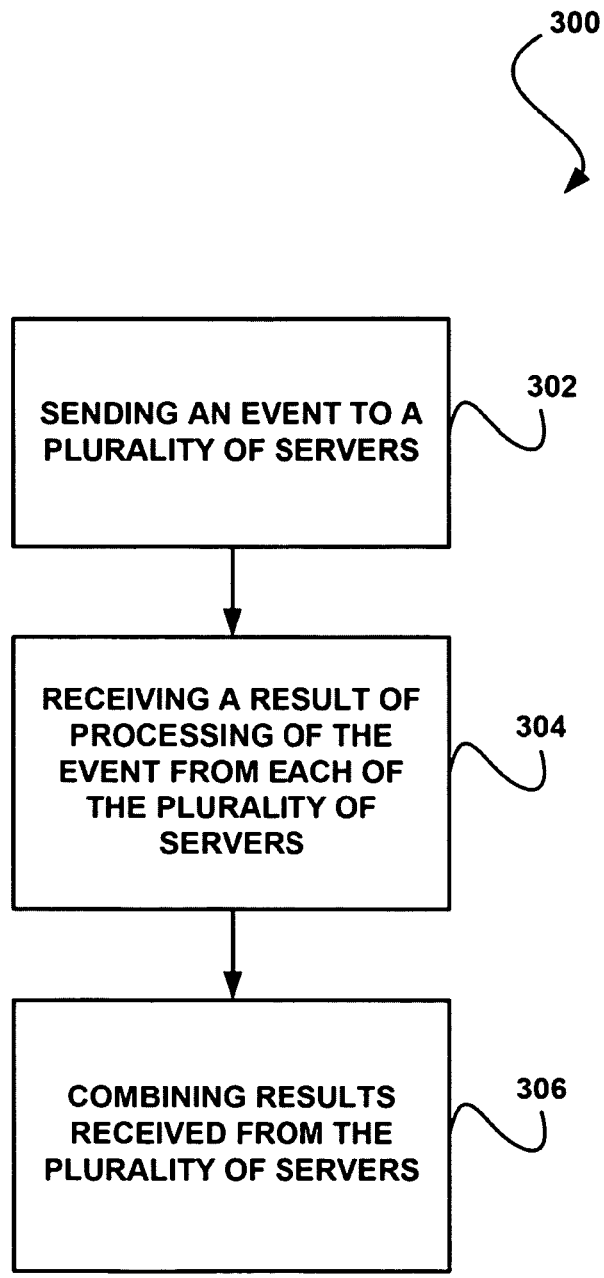
FIG. 3 illustrates a method for combining results of event processing received from a plurality of servers, in accordance with another embodiment.

FIG. 3 illustrates a method 300 for combining results of event processing received from a plurality of servers, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an event is sent to a plurality of servers. In the context of the present description, the event may include any data capable of being sent to the plurality of servers. As an option, the event may include an external message sent to the servers. Further, as yet another option, the external message may include a request, a command, an instruction, information, etc. In addition, as still yet another option, the event may include a data structure capable of being utilized by the servers. For example, the servers may utilize the event as a structured diagnosis tool.

Further, in one embodiment, sending the event may include communicating, transferring, forwarding, routing, etc. the event. As an option, the event may be sent utilizing a network. Optionally, the event may utilize a network protocol from an Internet protocol suite. For example, the Internet protocol suite may include a transmission control protocol (TCP), a user datagram protocol (UDP), an Internet protocol (IP), etc.

Further, in one embodiment, the event may be sent to the plurality of servers as a batch. Optionally, the batch may include a separate event for each server in the plurality of servers. For example, the number of separate events in the batch may be equal to the number of servers.

In another embodiment, the event may be sent by another server. As an option, the other server may include a test server, a management server, a diagnostic server, etc. Further, as yet another option, the other server may send the event in response to a request. For example, after receiving a request, the test server may send the event to each server in the plurality of servers.

Additionally, in yet another embodiment, the plurality of servers may include any number of servers capable of receiving an event. Optionally, the receiving may include accepting, catching, getting, etc. As an option, the servers may each include a network management system (NMS) server, an alert server, a monitoring server, a database server, an email server, a web server, an access server, etc.

In still yet another embodiment, each server may include a set of functions. As an option, the set of functions may be utilized to process the event. Further, as yet another option, the set of functions may include any number of functions capable of being utilized for processing the event. Optionally, each server may include the same set of functions as the other servers. For example, each server may include a set of functions identical to the set of functions on the other servers.

Further, in one embodiment, each function in the set of functions may be utilized to process the event. As another option, the processing may include utilizing the event as an input to the function. Further, as yet another option, the processing may include producing a result based on the input. For example, the function may utilize instructions and/or data associated with the event as input, and may produce the result based on the event.

In addition, in one embodiment, the sending of the event may initiate processing of the event. Optionally, the event batch sent to the servers may initiate processing of the event on each of the servers. As yet another option, the processing of the event on each server may be initiated after the server receives the event.

Additionally, in another embodiment, the processing of the event may utilize the set of functions. Optionally, the event may be utilized as an input to a first function of the set of functions. As another option, the first function may generate the result based on the input. For example, the first function may generate an intermediate result based on the event utilized as the input to the first function.

In yet another embodiment, the intermediate result from the first function may be sent to a second function of the set of functions. Optionally, the second function may utilize the intermediate result from the first function as an input to the second function. Thus, as one option, the intermediate result from a previous function may be used as the input to a next function of the set of functions.

Furthermore, in still yet another embodiment, a last function of the set of functions may utilize the intermediate result from the previous function as the input to the last function. Optionally, the last function may generate a final result of the processing of the event. As yet another option, the final result may be sent to the other server that sent the event to the server. Further, as one option, the final result may be sent to any server, device, client, etc.

In one embodiment, the processing of the event may include cross server processing. Optionally, the cross server processing may include performing the first function on a first one of the servers, and then performing the second function on a second one of the servers. As an option, the cross server processing may be performed in a slanted direction from one server to the next server or previous server. Furthermore, as still yet another option, the event may indicate the direction and/or order of the processing. Additionally, as an option, the direction and/or the order of the processing may be utilized to determine the next server and/or the previous server.

Additionally, in another embodiment, the cross server processing may include performing the processing of the event in a first direction. For example, the cross server processing may include sending the intermediate result of the first function to the next function on the next server. Further, in yet another embodiment, the cross server processing may include performing the processing of the event in a second direction opposite to the first direction. As another example, the cross server processing may include sending the intermediate result of the first function to the next function on the previous server.

Further, a result of processing of the event is received from each of the servers, as shown in operation 304. As an option, the result received from each of the servers may include a final result. Optionally, the final result may include the result from the last function of the set of functions. Additionally, as yet another option, the result may include any data sent from each of the servers that is associated with the processing of the event.

In addition, in yet another embodiment, after receiving the result of the processing of the event from each of servers, another event may be sent to the servers. Sending the other event may initiate processing of the other event on each of the servers. Further, as an option, the other event may indicate that the direction and/or order of the processing should be performed opposite to the direction and/or order of the event. Thus, the processing of a first event may be performed in a first direction, and the processing of a second event may be performed in a second direction opposite to the first direction. For example, the processing of the first event may be performed in a first direction from the first server to the second server, and the processing of the other event may be performed in a second direction from the first server to a last server, which is opposite to the first direction.

Additionally, in still yet another embodiment, the processing of the other event may generate another result. Optionally, the other result of the processing of the other event may be received from each of the servers. Further, as another option, the other result of the processing may include the final result of the processing of the other event.

In addition, the results received from the plurality of servers are combined. See operation 306. Optionally, the results received may include the results associated with the event, and/or the other results associated with the other event. For example, the results may include the result received from each of the servers and the other result received from each of the servers.

Furthermore, in one embodiment, the combining may include summing the results. As an option, the combining may include summing the results associated with the event and/or the other results associated with the other event. Optionally, the combining may include summing the result associated with the event and the other result associated with the other event for each server. Further, as yet another option, the combining may generate a combined result associated with each server. Still yet as another option, the combining may generate the combined result associated with the event batch.

In another embodiment, the combined results may be utilized to identify a malfunctioning function. As an option, the malfunctioning function may be identified based on the combined results. Optionally, based on the combined results, the malfunctioning function may be identified as having processed both the event and the other event. Further, as yet another option, based on the combined results, the malfunctioning function may be identified as being associated with a particular server.

To this end, sending the event to the plurality of servers and combining the results received from the plurality of servers may be utilized to identify the malfunctioning function. Thus, by combining the results associated with the event and the other event, the malfunctioning function may be accurately identified. For example, by combining first results received in response to a first event sent in a first batch with second results received in response to a second event sent in a second batch, the malfunctioning function may be identified in an efficient and accurate manner.

In still yet another optional embodiment, a set of pre-planned events (e.g. BIT events) may be sent to a plurality of servers. Further, a result of processing of the pre-planned events from a plurality of functions may be received from the plurality of servers. Optionally, the result may enable an identification of any malfunction. In addition, as yet another option, the results received from the plurality of servers may be combined to create a status of the plurality of servers.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
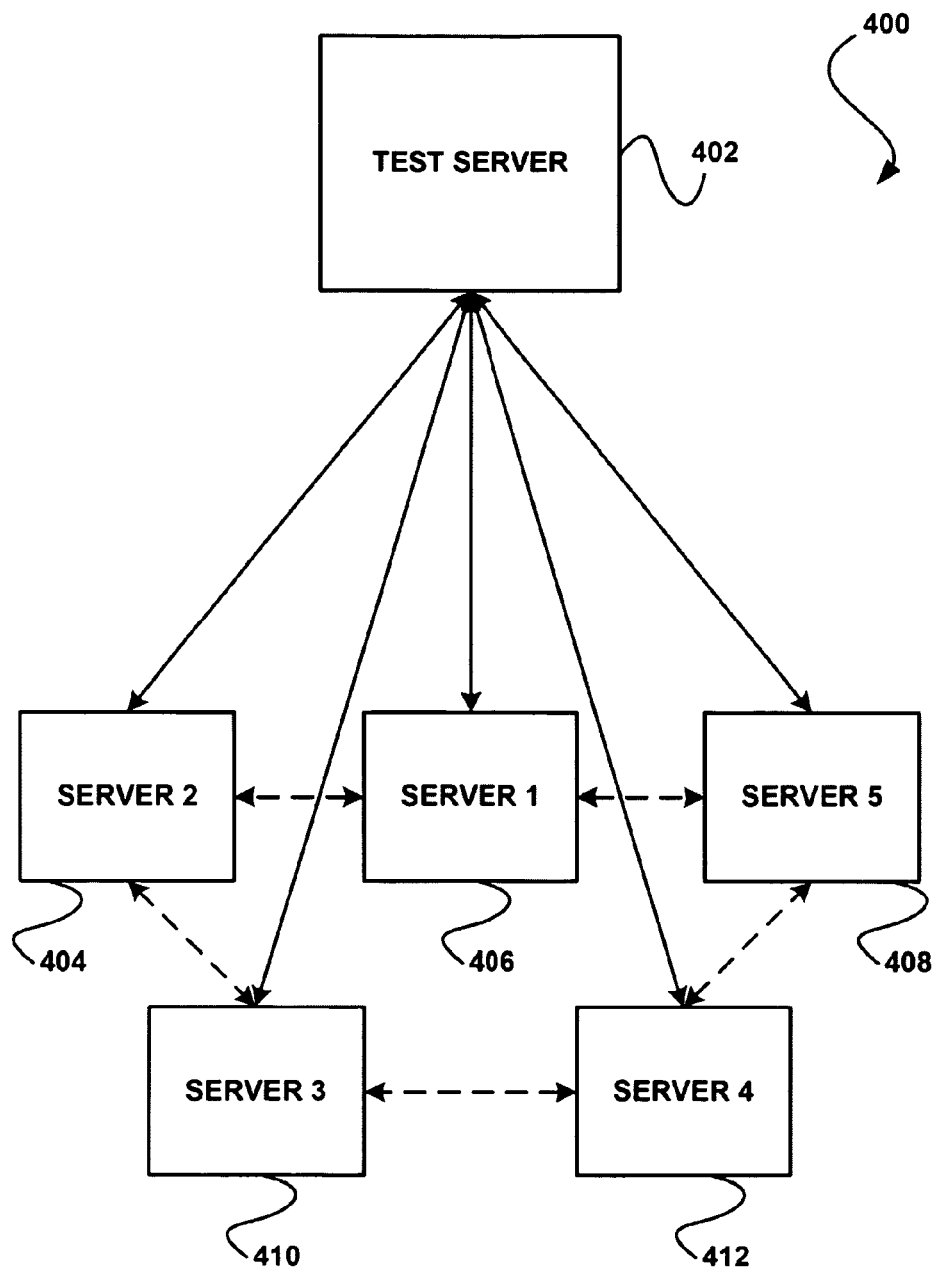
FIG. 4 illustrates a system for combining results of event processing received from a plurality of servers, in accordance with yet another embodiment.

FIG. 4 illustrates a system 400 for combining results of event processing received from a plurality of servers, in accordance with yet another embodiment. As an option, the system 400 may be implemented in the context of the details of FIGS. 1-3. Of course, however, the system 400 may be implemented in any desired environment. Further, the aforementioned definitions may equally apply to the description below.

In one embodiment, a test server 402 may send a first event batch to a set of servers 404-412. As an option, the first event batch may include a first event for each server in a set of servers 404-412. As an option, the set of servers 404-412 may not be limited to the five servers as illustrated, but may include any desired number of servers. Optionally, the test server 402 may include any device capable of sending the first event to the servers 404-412. For example, the test server 402 may send the first event associated with the first batch to each server in the set of servers 404-412.

Additionally, in another embodiment, each server in the set of servers 404-412 may receive the first event from the test server. In addition, as another option, after receiving the first event, each server may process the event. Optionally, the first event may be processed utilizing a first function in a set of functions. As yet another option, the set of functions may be included on each server. Further, as one option, the first function may generate a first result based on the processing of the first event.

In addition, in yet another embodiment, after processing the first event utilizing the first function, each server may determine which other server to send the first result. Optionally, a direction to send a result may be indicated by the first event. For example, the first event may indicate that the result should be sent to a next function on a next server. As yet another example, the first event may indicate that the result should be sent to the next function on a previous server. To this end, the servers 404-412 may be ordered.

Just by way of example, a first server 406 may send the result to a second server 404 or a fifth server 408 (e.g. the last server). In addition, in one embodiment, the second server 404 may send the result to a third server 410 or the first server 406. As another embodiment, the third server 410 may send the result to a fourth server 412 or the second server 404. Further, as yet another embodiment, the fourth server 412 may send the result to the fifth server 408 or the third server 410. Furthermore, as still yet another embodiment, the fifth server 408 may send the result to the first server 406 or the fourth server 412.

In one embodiment, the result from each function of the set of functions may be sent as an input to the next function. As an option, the result may include a previous result from at least one previous function. Optionally, if function includes the last function, then the result may be sent to the test server 402. For example, after the last function processes the result received from a previous function, then the last function may send a final result to the test server 402.

In another embodiment, the test server 402 may receive the final result associated with the first event from each of the servers. As an option, after receiving the final result associated with the first event, the test server 402 may send a second event to each server in a set of servers 404-412. Optionally, the second event may indicate that the result of processing the second event should be sent in a second direction, where the second direction is opposite to the direction indicated by the first event. For example, if the first event indicated that a result should be sent to a next server, the second event may indicate that a result should be sent to a previous server.

Further, in yet another embodiment, the last function may send the final result associated with the second event to the test server 402. Optionally, the final result may include the final result of the processing of the second event in the second direction. In still yet another embodiment, the test server 402 may receive the final result associated with the second event from each of the servers 404-412.

Additionally, in another embodiment, the final result from each server in the set of servers 404-412 that is associated with the first event and/or the second event may be compared against an expected result associated with the processing of the first event and/or the second event. As an option, if the final result matches the expected result, then the final result may be indicated as a success. As another option, if the final result does not match the expected result, then the final result may be indicated as a failure.

In still yet another embodiment, the test server 402 may combine the final results received from the set of servers. As an option, the test server 402 may combine the final result received from each server in the set of servers 404-412 that is associated with the first event and the second event. As another option, the test server 402 may combine the final results associated with the first event batch received from each server in the set of servers 404-412. Optionally, the test server 402 may combine the final results associated with the second batch received from each server in the set of servers 404-412.

Furthermore, in one embodiment, a malfunctioning function may be identified utilizing the test server 402 based on the combination of the final results. Optionally, the malfunctioning function may produce a result that is different from a result produced by a normally operating function. For example, the normally operating function F1 may produce an expected result given an input, and the malfunctioning function F1 may produce an unexpected result given the same input.

In addition, in another embodiment, the malfunctioning function may be identified by a combination of the final results that are indicated as a failure. Optionally, for each final result indicated as a failure, each server in the set of servers 404-412 and/or associated function utilized to process the event may be identified. As an option, each server in the set of servers 404-412 and associated function may be identified based on a number of functions and a number of servers in the set of servers 404-412 that are associated with a particular processing direction that generated the final result indicated as a failure.

Furthermore, as another option, all the servers in the set of servers 404-412 and functions associated with each final result indicated as a failure are identified. In addition, by combining the servers 404-412 and functions, the malfunctioning function may be identified via the server 404-412 and associated function identified by each final result. For example, if a third function on the fourth server 412 is malfunctioning, then the third function on the fourth server 412 may be identified as having processed the event associated with the failed result for each direction.

Additionally, as yet another example, if a ninth function on a sixth server (not shown) is malfunctioning, then the ninth function on the sixth server will have processed the event in the first direction and in the second direction. Further, in the context of the current example, the ninth function on the sixth server may be associated with a first failed result and the second failed result, and therefore, may be identified as malfunctioning based on the combination of the results.

Figure 5A:
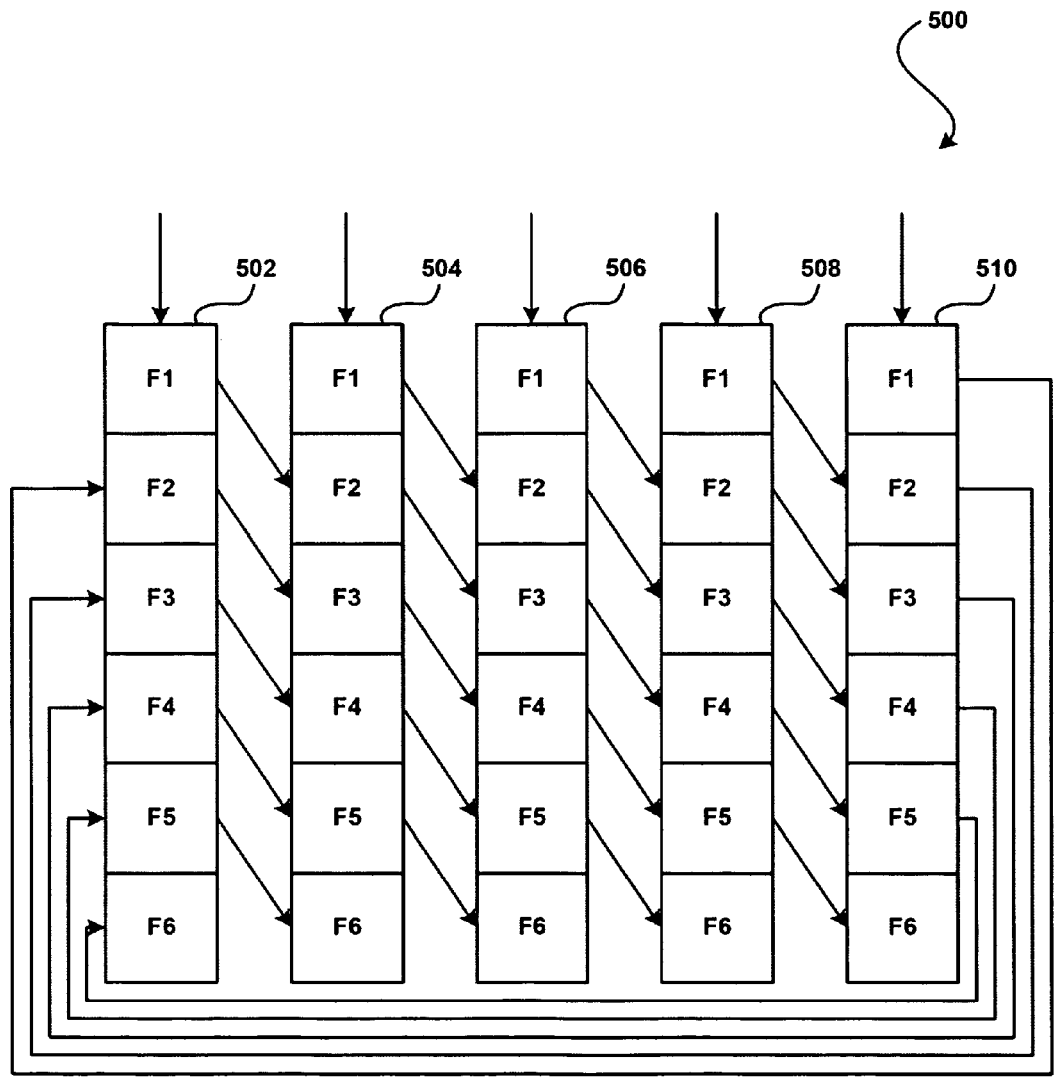
FIG. 5A illustrates a system for performing a function test for each function of a set of functions utilizing a plurality of servers, in accordance with still yet another embodiment.

FIG. 5A illustrates a system 500 for performing a function test for each function of a set of functions utilizing a plurality of servers, in accordance with still yet another embodiment. As an option, the system 500 may be implemented in the context of the details of FIGS. 1-4. Of course, however, the system 500 may be implemented in any desired environment. Further, the aforementioned definitions may equally apply to the description below.

In one embodiment, a set of servers may include a set of functions on each server. As an option, each server may include the same set of functions as the other servers in the set of servers. Optionally, these functions may be utilized to process an input and/or produce an output.

In another embodiment, an event may be sent to each server in the set of servers. As an option, the event may be included in a batch of events. For example, the event may be sent to a first server 502, a second server 504, a third server 506, a fourth server 508, and a fifth server 510. Optionally, a direction to which to send a result of processing of the event may be indicated by the event. With respect to the present embodiment, the direction of the processing may indicate that a server should send a result to a next server, based on an ordering of the servers Further, in one embodiment, the first server 502 may receive the event. As an option, the event may be processed by a first function (e.g. F1) on the first server 502. Further, as yet another option, a first result of the processing may be generated by the first function. As still yet another option, the first server 502 may send the first result to a second function (e.g. F2) on the second server 504.

Additionally, in another embodiment, the second server 504 may receive the first result from the first server 502, based on the direction indicated by the event. As an option, the first result may be processed by the second function on the second server 504. Further, as yet another option, a second result of the processing may be generated by the second function. As still yet another option, the second server 504 may send the second result to a third function (e.g. F3) on the third server 506.

In addition, in yet another embodiment, the third server 506 may receive the second result from the second server 504. As an option, the second result may be processed by the third function on the third server 506. Further, as yet another option, a third result of the processing may be generated by the third function. As still yet another option, the third server 506 may send the third result to a fourth function (e.g. F4) on the fourth server 508.

Furthermore, in still yet another embodiment, the fourth server 508 may receive the third result from the third server 506. As an option, the third result may be processed by the fourth function on the fourth server 508. Further, as yet another option, a fourth result of the processing may be generated by the fourth function. As still yet another option, the fourth server 508 may send the fourth result to a fifth function (e.g. F5) on the fifth server 510.

Further, in one embodiment, the fifth server 510 may receive the fourth result from the fourth server 508. As an option, the fourth result may be processed by the fifth function on the fifth server 510. Further, as yet another option, a fifth result of the processing may be generated by the fifth function. As still yet another option, the fifth server 510 may send the fifth result to a sixth function (e.g. F6) on the first server 502.

Additionally, in another embodiment, the first server 502 may receive the fifth result from the fifth server 510. As an option, the fifth result may be processed by the sixth function on the first server 502. Further, as yet another option, a sixth result of the processing may be generated by the sixth function. As still yet another option, since the sixth function is the last function, as illustrated, then the sixth result may be the final result for the processing flow of the event initially received at the first server 502. Additionally, as another option, the final result may be sent to a processing server. For example, the processing server may have sent the event to the first server 502.

In addition, in yet another embodiment, a similar processing flow is performed for the events received at the second server 504, the third server 506, the fourth server 508, and the fifth server 510. For example, the sixth functions of each server may generate the final result of processing for the received event. As yet another example, if the third function of the fourth server 508 is malfunctioning, then the final result generated by the sixth function of the second server 504 may be different than the final results generated by the sixth function of the other servers.

Figure 5B:
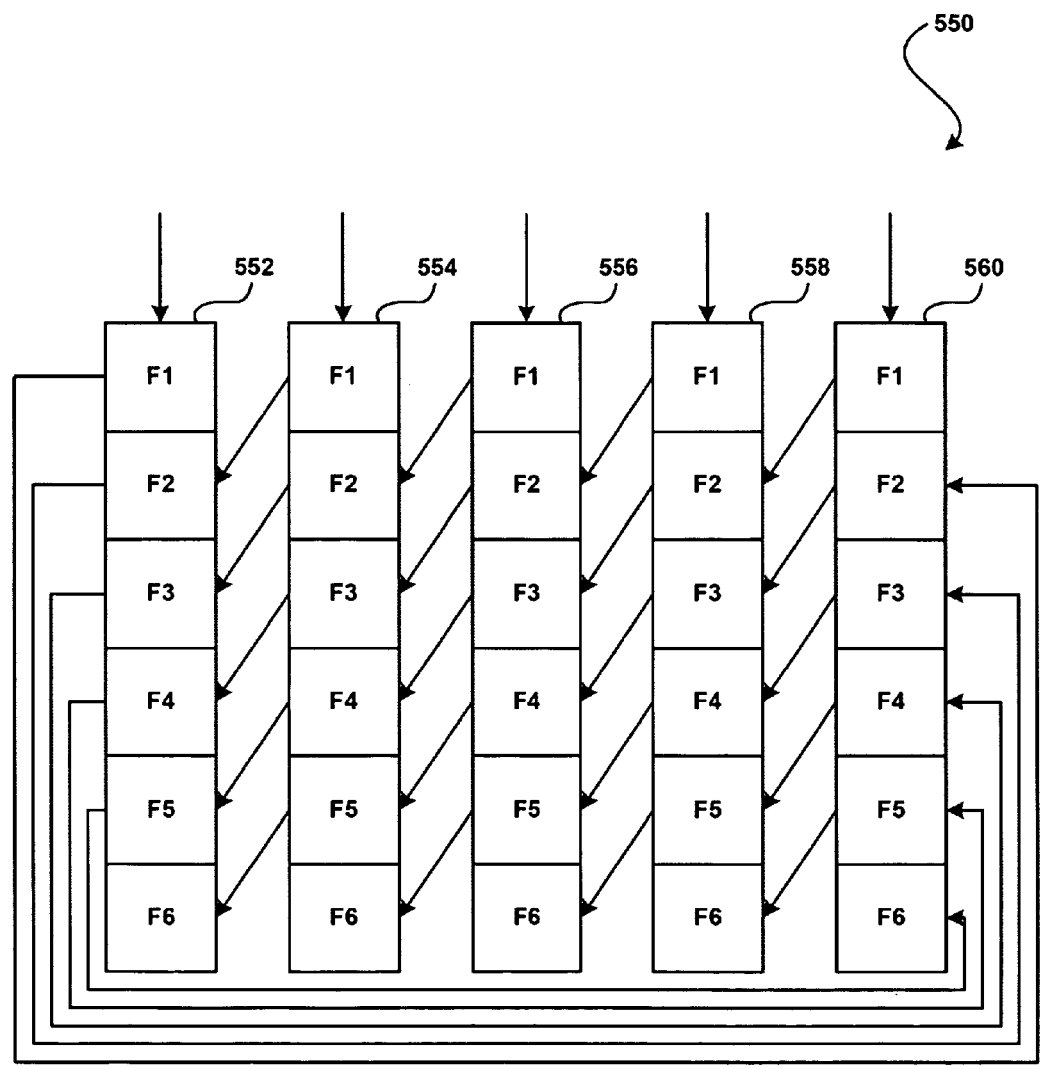
FIG. 5B illustrates a system for performing a function test for each function of a set of functions utilizing a plurality of servers, in accordance with another embodiment.

FIG. 5B illustrates a system 550 for performing a function test for each function of a set of functions utilizing a plurality of servers, in accordance with another embodiment. As an option, the system 550 may be implemented in the context of the details of FIGS. 1-5A. Of course, however, the system 550 may be implemented in any desired environment. Further, the aforementioned definitions may equally apply to the description below.

In one embodiment, a set of servers may include a set of functions on each server. As an option, each server may include the same set of functions as the other servers. Optionally, these functions may be utilized to process an input and/or produce an output.

In another embodiment, an event may be sent to each server in the set of servers. As an option, the event may be included in a batch of events. For example, the event may be sent to a first server 552, a second server 554, a third server 556, a fourth server 558, and a fifth server 560. Optionally, a direction to which to send a result of processing of the event may be indicated by the event. With respect to the present embodiment, the direction of the processing may indicate that a server should send a result to a previous server, based on an ordering of the servers. As an example, the event may be associated with a second batch of events, such that the direction of the processing may be indicated as a direction opposite of a direction of the processing for a first batch of events (e.g. opposite the direction of processing shown in FIG. 5A).

Further, in one embodiment, the first server 552 may receive the event. As an option, the event may be processed by a first function (e.g. F1) on the first server 552. Further, as yet another option, a first result of the processing may be generated by the first function. As still yet another option, the first server 552 may send the first result to a second function (e.g. F2) on the fifth server 560.

Additionally, in another embodiment, the fifth server 560 may receive the first result from the first server 552. As an option, the first result may be processed by the second function on the fifth server 560. Further, as yet another option, a second result of the processing may be generated by the second function. As still yet another option, the fifth server 560 may send the second result to a third function (e.g. F3) on the fourth server 558.

In addition, in yet another embodiment, the fourth server 558 may receive the second result from the fifth server 560. As an option, the second result may be processed by the third function on the fourth server 558. Further, as yet another option, a third result of the processing may be generated by the third function. As still yet another option, the fourth server 558 may send the third result to a fourth function (e.g. F4) on the third server 556.

Furthermore, in still yet another embodiment, the third server 556 may receive the third result from the fourth server 558. As an option, the third result may be processed by the fourth function on the third server 556. Further, as yet another option, a fourth result of the processing may be generated by the fourth function. As still yet another option, the third server 556 may send the fourth result to a fifth function (e.g. F5) on the second server 554.

Further, in one embodiment, the second server 554 may receive the fourth result from the third server 556. As an option, the fourth result may be processed by the fifth function on the second server 554. Further, as yet another option, a fifth result of the processing may be generated by the fifth function. As still yet another option, the second server 554 may send the fifth result to a sixth function (e.g. F6) on the first server 552.

Additionally, in another embodiment, the first server 552 may receive the fifth result from the second server 554. As an option, the fifth result may be processed by the sixth function on the first server 552. Further, as yet another option, a sixth result of the processing may be generated by the sixth function. As still yet another option, since the sixth function is the last function, as illustrated, then the sixth result may be the final result for the processing flow of the event initially received at the first server 552. Additionally, as another option, the final result may be sent to a processing server. For example, the processing server may have sent the event to the first server 552.

In addition, in yet another embodiment, a similar processing flow is performed for the events received at the second server 554, the third server 556, the fourth server 558, and the fifth server 560. For example, the sixth functions of each server may generate the final result of processing for the received event. As yet another example, if the third function of the fourth server 558 is malfunctioning, then the final result generated by the sixth function of the first server 552 may be different than the final results generated by the sixth function of the other servers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for identifying a plurality of servers, where each server includes a plurality of functions, and where both the plurality of servers and the plurality of functions are arranged in a predetermined order;
   computer code for sending a first event to each of the plurality of servers according to the predetermined order of the plurality of servers and the predetermined order of the plurality of functions, where the first function of each of the plurality of servers processes the event to obtain an intermediate result, and each of the plurality of servers sends the intermediate result to a subsequent function of a subsequent server according to the predetermined order of the plurality of servers and the predetermined order of the plurality of functions, where:
      when the subsequent function of the subsequent server is not determined to be the last function within the subsequent server, the subsequent function processes the event to obtain another intermediate result and the subsequent server sends the other intermediate result to another subsequent function of another subsequent server according to the predetermined order of the plurality of servers and the predetermined order of the plurality of functions, and
      when the subsequent function of the subsequent server is determined to be the last function within the subsequent server, the last function processes the event to obtain a final result of the first event and the subsequent server returns the final result of the first event;
   computer code for sending a second event to each of the plurality of servers according to an opposite order of the predetermined order of the plurality of servers, where the first function of each of the plurality of servers processes the second event to obtain a second intermediate result, and each of the plurality of servers sends the second intermediate result to the subsequent function of the previous server according to the opposite order of the predetermined order of the plurality of servers, and according to the predetermined order of the plurality of functions, where:
      when the subsequent function of the previous server determined to be the last function within the subsequent server, the subsequent function processes the event to obtain another second intermediate result and the previous server sends the other second intermediate result to another subsequent function of another previous server according to the opposite order of the predetermined order of the plurality of servers and the predetermined order of the plurality of functions, and when the subsequent function of the previous server is determined to be the last function within the subsequent server, the last function processes the event to obtain the final result of the second event and the previous server returns the final result of the second event;

computer code for receiving the final results of the first event and the fine results of the second event;

computer code for combining the final results of the first event and the final result of the second event received from the plurality of servers, such that a combined result associated with each server is generated; and computer code for identifying a malfunctioning function of the set of functions, based on the combined results.

2. The computer program product of claim 1, wherein a sending of the plurality of events initiates the processing of the event on each of the servers.

3. The computer program product of claim 1, wherein the plurality of functions on a first one of the servers is identical to the plurality of functions on each other one of the servers.

4. The computer program product of claim 1, wherein the sending of the second event initiates processing of the second event on each of the servers.

5. The computer program product of claim 1, wherein combining the final results includes summing the final results.

6. The computer program product of claim 1, wherein identifying the malfunctioning function includes comparing the combined results against an expected result associated with the processing of the plurality of events.

7. The computer program product of claim 1, wherein identifying the malfunctioning function based on the combined results includes identifying a result within the combined results that is different from a result produced by a normally operating function of the set of functions.

8. A method, comprising:
identifying a plurality of servers, where each server includes a plurality of functions, and where both the plurality of servers and the plurality of functions are arranged in a predetermined order;

sending a first event to each of the plurality of servers according to the predetermined order of the plurality of servers and the predetermined order of the plurality of functions, where the first function of each of the plurality of servers processes the event to obtain an intermediate result, and each of the plurality of servers sends the intermediate result to a subsequent function of a subsequent server according to the predetermined order of the plurality of servers and the predetermined order of the plurality of functions, where:

when the subsequent function of the subsequent server is not determined to be the last function within the subsequent server, the subsequent function processes the event to obtain another intermediate result and the subsequent server sends the other intermediate result to another subsequent function of another subsequent server according to the predetermined order of the plurality of servers and the predetermined order of the plurality of functions, and when the subsequent function of the subsequent server is determined to be the last function within the subsequent server, the last function processes the event to obtain a final result of the first event and the subsequent server returns the final result of the first event;

sending a second event to each of the plurality of servers according to an opposite order of the predetermined order of the plurality of servers, where the first function of each of the plurality of servers processes the second event to obtain a second intermediate result, and each of the plurality of servers sends the second intermediate result to the subsequent function of the previous server according to the opposite order of the predetermined order of the plurality of servers, and according to the predetermined order of the plurality of functions, where:

when the subsequent function of the previous server is not determined to be the last function within the subsequent server, the subsequent function processes the event to obtain another second intermediate result and the previous server sends the other second intermediate result to another subsequent function of another previous server according site to the opposite order of the predetermined order of the plurality of servers and the predetermined order of the plurality of functions, and when the subsequent function of the previous server is determined to be the last function within the subsequent server, the last function processes the event to obtain the final result of the second event and the previous server returns the final result of the second event;

receiving the final results of the first event and the final results of the second event;

combining the final results of the first event and the final result of the second event received from the plurality of servers, such that a combined result associated with each server is generated; and identifying a malfunctioning function of the set of functions, based on the combined results.

9. A system, comprising:
a processor; and
a memory coupled to the processor;
wherein the memory storing computer executable instructions for:
identifying a plurality of servers, where each server includes a plurality of functions, and where both the plurality of servers and the plurality of functions are arranged in a predetermined order;

sending a first event to each of the plurality of servers according to the predetermined order of the plurality of servers and the predetermined order of the plurality of functions, where the first function of each of the plurality of servers processes the event to obtain an intermediate result, and each of the plurality of servers sends the intermediate result to a subsequent function of a subsequent server according to the predetermined order of the plurality of servers and the predetermined order of the plurality of functions, where:

when the subsequent function of the subsequent server is not determined to be the last function within the subsequent server, the subsequent function processes the event to obtain another intermediate result and the subsequent server sends the other intermediate result to another subsequent function of another subsequent server according to the predetermined order of the plurality of servers and the predetermined order of the plurality of functions, and when the subsequent function of the subsequent server is determined to be the last function within the subsequent server, the last function processes the event to obtain a final result of the first event and the subsequent server returns the final result of the first event;

sending a second event to each of the plurality of servers according to an opposite order of the predetermined order of the plurality of servers, where the first function of each of the plurality of servers processes the second event to obtain a second intermediate result, and each of the plurality of servers sends the second intermediate result to the subsequent function of the previous server according to the opposite order of the predetermined order of the plurality of servers, and according to the predetermined order of the plurality of functions, where:

when the subsequent function of the previous server is not determined to be the last function within the subsequent server, the subsequent function processes the event to obtain another second intermediate result and the previous server sends the other second intermediate result to another subsequent function of another previous server according the opposite order of the predetermined order of the plurality of servers and the predetermined order of the plurality of functions, and when the subsequent function of the previous server is determined to be the last function within the subsequent server, the last function processes the event to obtain the final result of the second event and the previous server returns the final result of the second event;

receiving the final results of the first event and the final results of the second event;

combining the final results of the first event and the final result of the second event received from the plurality of servers, such that a combined result associated with each server is generated; and identifying a malfunctioning function of the set of functions, based on the combined results.

\* \* \* \* \*